Figure 1:
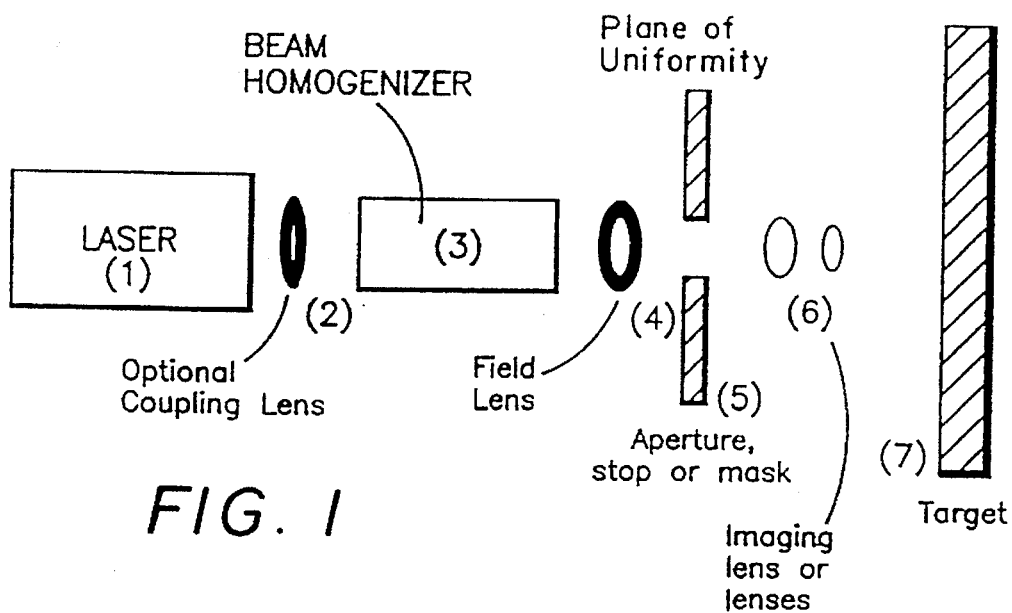

United States Patent [19]

Lewis et al.

[11] Patent Number: 5,657,138
[45] Date of Patent: Aug. 12, 1997

[54] GENERATING DEFINED STRUCTURES ON MATERIALS USING COMBINED OPTICAL TECHNOLOGIES FOR TRANSFORMING THE PROCESSING BEAM

[76] Inventors: Aaron Lewis, 38 Woodcrest Ave., Ithaca, N.Y. 14850; Ilan Pinevsky, P.O. Box 29190, Jerusalem, Israel, 91261

[21] Appl. No.: 642,888

[22] Filed: May 6, 1996

Related U.S. Application Data

[62] Division of Ser. No. 211,705, filed as PCT/US92/08515, Oct. 13, 1992, abandoned.

[30] Foreign Application Priority Data

Oct. 13, 1991 [IL] Israel ........................... 99727

[51] Int. Cl.$^6$ ..................... B23K 26/06; G02B 5/32; G02B 5/02
[52] U.S. Cl. ........................ 359/15; 219/121.73
[58] Field of Search ............... 359/15, 19, 20, 359/16, 22, 25, 9, 599; 219/121.73

[56] References Cited

U.S. PATENT DOCUMENTS 3,617,702  11/1971  Flournoy .
4,275,288   6/1981  Makosch et al. .
4,306,763  12/1981  Huignard .
4,475,027  10/1984  Pressley .
4,685,780   8/1987  Kimura .
4,733,944   3/1988  Fahlen et al. .
4,734,550   3/1988  Imamura et al. .
4,910,739   3/1990  Sheng .
4,940,308   7/1990  Debesis .
4,998,787   3/1991  Caputi et al. ........................... 359/20
5,055,653  10/1991  Funami et al. .
5,059,013  10/1991  Jain .
5,109,465   4/1992  Klopotek .

*Primary Examiner*—Jon W. Henry
*Attorney, Agent, or Firm*—Jones, Tullar & Cooper, P.C.

[57] ABSTRACT

A method of optically processing a laser beam for in turn processing a substrate with the processed laser beam is disclosed. The energy of the laser beam is altered so that the substrate can be properly processed even with laser outputs of poor beam quality such as low spatial or temporal coherence or unreproducible multimode structure or poor beam pointing stability. The method uses an optical integrator and appropriate optical elements based on the principles of geometrical optics. The optical elements may be aspherical lenses or mirrors whose surface shapes are derived mathmatically based on the desired energy redistribution and based on working in a region where the interaction of the substrate material and the laser energy is known.

7 Claims, 3 Drawing Sheets

GENERATING DEFINED STRUCTURES ON MATERIALS USING COMBINED OPTICAL TECHNOLOGIES FOR TRANSFORMING THE PROCESSING BEAM

This application is a division of application Ser. No. 08/211,705, filed as PCT/US92/08515 Oct. 13, 1992, now abandoned.

1. FIELD OF THE INVENTION

A method for transforming processing beams in order to produce a desired energy profile on a target which is to be processed by the beam.

2. BACKGROUND OF THE INVENTION

Many problems in materials processing require the use of a high power laser (or similar light source) which could have a variety of problems. Some of these problems could be a multimode beam structure that may be irreproducible from pulse to pulse or in long term operation and/or a low temporal coherence and/or a low spatial coherence and/or a bad beam pointing stability. Therefore because of these difficulties in achieving a reliable $I(x,y,z,t)$, where I is intensity, t is the time coordinate and x,y,z are arbitrary space coordinates, it is difficult in general to use certain lasers to simultaneously process an entire area even when the energy of the laser beam is high enough. The object of the invention is to provide a method of getting reproducible, stable, and reliable energy profiles on a desired surface on which the material to be processed is placed. In general material processing by light does not depend on the phase of the beam profile, i.e. its spatial coherence and thus, our invention is restricted to those cases in which the phases of the $I(x,y,z)$ are not a relevant factor.

To meet the requirements for an appropriate $I(x,y,z)$ distribution we apply a combination of technologies based on geometrical optical and physical optical principles.

3. STATE OF PRIOR ART

One of the conventional approaches for material processing, such as photochemical ablation of organic and inorganic materials, superconductor deposition, material cutting and patterning, silicon wafers annealing, etc., is to scan a beam across the area of the material to be processed. Another approach keeps the laser and the sample stationary and uses either a laser with a uniform beam profile or improves an existing laser beam profile in conjunction with a set of apertures (or other masks) which are changed during the material processing. An alternate to the use of a set of apertures in this method is the possibility of using a set of rotating-scanning slits.

The improvement of the beam uniformity is achieved by rotating the beam which produces a time average. To achieve this a rotating set of mirrors or a dove prism can be used. Alternately, refractive optics such as a Fly's eye lens can be used and other possibilities include using an incoherent fiber bundle or biprisms to get beam folding etc. The rotation of the beam is problematic because of problems with the laser beam pointing stability, high sensitivity to misalignments during the rotation and other mechanical constraints. But mainly, it cannot fully resolve the problem of hot/cold spots in the initial beam profile which will appear as tracks of high or low energy in the rotated average beam profile. The refractive methods have low throughput (Fly's eye lens) and are often not suitable for high power lasers in a specific wavelength. In some cases even the improvement is not enough for the desired materials processing application. For example biprisms can make a good beam better but cannot turn a bad beam into a good beam.

Using scanning beams and rotating slits have some typical disadvantages. For example, often higher energy per pulse in a given local area (or higher repetition rate) is needed to complete the desired process in a time which is not too long when compared to a methodology that could process the material in parallel. However, the use of higher energies and/or repetition rates may cause higher mechanical stress on the material, increase the heating problems and/or produce unwanted nonlinear radiation-material interactions. Another problem in such serial approaches is the higher sensitivity to fluctuations of the pulse to pulse energy. Furthermore, an additional problem in the use of such sets of apertures and stops (after beam homogenization by conventional techniques or without any homogenization) which are replaced during the processing is the limited number of possible transformations in a given set of apertures-stops. This causes a profiled surface that has higher surface roughness than other methodologies. Finally, other common disadvantages or problems include radiation material interactions that have an accumulated effect and/or reach a steady state of processing (etching, for example) as a function of the pulse energy after tens or hundreds of pulses. Therefore to get high reliability, predictability and reproducibility of the modulated controlled process according to a desired program requires that each point in the material will be exposed to hundreds of pulses continuously [see, for example, R. Srinivasan et al, Amer. J. of Opht., (1987), 470–471]. This demand is rarely fulfilled by the above described methods.

4. SUMMARY OF THE INVENTION

This invention is different from the conventional methods which were described in the "State of Prior Art", because they modulate the material processing in space using modulated energy profiles rather than changing the number of pulses in a local area. This is based on the fact that processes such as photochemical ablation have typical response of etching depth (or other changes of the material) per pulse as a function of energy, therefore one may work in the linear or the nonlinear regime with the condition that for a given processing the responsivity of the specific material with a specific wavelength, energy and pulse width are known previously. See, for example, G. M. Davis et al, J. Phys. D: Appl. Phys. 21, (1988), 683–687 (for etching of GaAs), or A. Fuxbruner et al., Appl. Opt., Vol. 29, No. 36, (1990), 5380–5385 (for etching of organic polymers and corneal tissues).

5. BRIEF DESCRIPTION OF THE DRAWINGS

List of figures:

1. Scheme of the simplest system with beam homogenizer to get uniform energy on a target ng.

2. Multi Hologram Optical Element.

3. Simple scheme which combines beam homogenizer with a diffractive element as a hologram.

4. Schemes for apertures and stops with circular symmetry.

5. Simple scheme for a light processing system which combines beam homogenizer with computer controlled apertures and/or stops.

6. Schematic structure of a "negative" nontransparent mask.

6. DETAILED DESCRIPTION OF THE INVENTION

6.1 Methods Using Transformed Energy Profiles

For processes of radiation—material interaction which are energy dependent and the dependence is known, it is possible to control the process to achieve a desired spatial structure by transforming the energy profile which is responsible for the process according to a known dependence of the laser material interaction and the structure that is desired on the substrate. The following schemes are designed to accomplish this task, namely, of getting transformed spatial energy profiles on a target, which may be the external surface of a material or an internal surface for materials that are transparent to the incident light and interact with the light in a linear or non-linear way.

6.1.1 Geometrical Optical Technologies of Beam Transformation

As was mentioned previously, high power lasers may have rather poor output energy distributions with low reproducibility and problems of beam pointing stability. Therefore, we suggest to use a beam homogenizer of the channel Integrator type [see, for example, J. M. Geary, Opt. Eng., Vol. 27, No. 11, (1988), 972–977], or other approaches for beam homogenization. Such beam homogenizers are more suitable for high power lasers because they contain reflecting surfaces and yield a uniform energy plane in a given distance from the exit (5 in FIG. 1). With throughput that can exceed 90% of the input energy, this distance can be controlled and the uniform plane of energy can be imaged to the processing plane (7 in FIG. 1) with a high depth of field. Some high power lasers, such as excimer and $CO_2$ lasers, have low spatial and temporal coherence. Those are advantages to the use of channel Integrators as beam homogenizers because they eliminate the interference fringes that would appear otherwise in the plane of energy uniformity (because rays are coming from different angles).

The next step after getting the uniform plane of energy is to transform it according to the desired structure in the processed material. This is described in the next subsections under the Geometrical Optical Techniques.

6.1.1.1. Transformations by Masks Which Are Based on Partial Absorption and/or Reflection By placing a mask in the plane of uniformity (5 in FIG. 1) and using a material with an absorption described as A(x,y), it is possible to modulate the intensity to get any I(x,y), where A is the absorption in %, I is the intensity density and x,y are the cross section coordinates. In this case $I(x,y)=I_0*A(x,y)$ where $I_0$ is the energy density in the plane of uniformity. The divergence of the beam that exits the beam homogenizer (3 in FIG. 1) is relatively high (typical values are bigger than 15 mrad) and therefore because of the low spatial coherence it is possible to get an image of this mask on the target (7 in FIG. 1) without a typical diffraction pattern. The dimensions at the plane of uniformity are of 1 cm×1 cm order or bigger, therefore the energy density can be low enough in the mask plane to be below the damage threshold of the mask. The dimensions of the imaged plane on the other hand can be much smaller according to the demagnification in the imaging so that the energy density on the target will be enough for the processing.

The mask construction can be divided into two approaches:

(i) Masks which are constructed from thin layers with modulated thickness on transparent slides:

According to the laser which is used, the material the thin layer is made from is chosen, to accomplish high damage threshold and appropriate depth of absorption. The absorption coefficient multiplied by the accuracy of the thin layer coating and/or deposition thickness should be lower than the required accuracy for A (x, y), on the other hand the absorption coefficient should be high enough to get the desired modulation with thin coatings.

(ii) Masks which are based on slides with variable thickness:

According to the laser which is used a material is chosen that has high damage threshold and moderate absorption. Then the bulk of the material is etched to get the desired A (x, y). The absorption depth of the material should be high enough to be able to get the modulation in a thin slide but at the same time it should be low enough so that the accuracy of the etching process multiplied by the absorption coefficient will meet the requirements for the accuracy of A (x, y). The etched surfaces should remain perpendicular to avoid refracting effects for the beam which passes through the mask.

6.1.1.2 Beam Transformation by Refractive Optical Means

According to the desirable energy profile on the target it is possible to specify an aspherical surface for a singlet lens which will convert the uniform energy profile (5 in FIG. 1) to the desired one [see, for example, P. W. Rhodes et al. Appl. Opt., Vol. 19, No. 20, (1980), 3545–3553]. For beam homogenizers with low divergence of the exit beam (or in some other cases where the wavefront is known) it is possible to derive differential equations which specify the aspherical surfaces. According to the laser which is used for the material processing, the material for the lens is chosen. Nowadays several methods exist to fabricate such aspherical surfaces: diamond machining, solgel processing, etc. This approach has an advantage, compared to the mask approach, because there is no intrinsic absorption (which may be problematic using high power lasers), therefore it is, also, more efficient in the use of the laser energy.

6.1.1.3. Beam Transformation by a System of Mirrors

With similarity to 6.1.1.2. it is possible to derive shapes of mirrors which will transform the uniform energy profile to a desirable profile on the target. Diamond machining has accomplished very sharp curvatures and can fulfill the requirements of derived shapes. This approach may have a significant advantage, compared to the above approaches for beam transformation, using high power lasers because the light does not pass through the material.

6.1.2. Physical Optical Technologies for Beam Transformation

It is possible to reshape the energy profile of a collimated laser beam to another desirable beam profile by holographic filters. These holograms may be recorded optically (analog recording on a photo sensitive material) or generated by computer.

6.1.2.1. Analog Holograms

A mask with the desirable energy profile is illuminated with the object beam and using a reference beam the hologram is recorded. By illumination with a reconstructing reference beam which is an exact phase conjugate of the recording reference beam, the image of the mask is reconstructed; therefore it is possible to get a desirable energy profile in the reconstructing process. There are a wide variety of possible holographic arrangements. For high power lasers with low spatial coherence and low temporal coherence it may be worthwhile to choose arrangements in which the hologram is recorded in a plane very close to the mask or to record Fourier Holograms using an appropriate lens in the recording and reconstructing. In addition, for high resolution image projection it may be necessary to use diffraction gratings to decrease the spectral bandwidth.

Phase holograms may be recorded this way on materials which are transparent for the processing beam (after recording on photoresist and applying photolithography techniques) or on nontransparent materials which were patterned and overcoated with a reflective layer. Therefore it is possible to get reconstruction efficiencies higher than 30%, using a high power laser without any intrinsic absorption in the filter stage.

6.1.2.2 Computer Generated Hologram (CGH)

With this same vein of physical optics approaches of beam transformation, a CGH can be constructed to provide energy redistributions and/or phase corrections. For material processing it may be enough to use a single holographic optical element to redistribute the energy of the input beam into the necessary near-field intensity profile on the target. A second element may be used to place the correct phase onto this beam [see, for example, M. T. Eismann, Appl. Opt. Vol. 28, No. 13, (1989), 2641–2650]. A significant advantage of this approach may be the possibility of getting the distributed energy profile on any desired surface with any curvature, together with, high reliability and flexibility which are characteristic of computer designed elements.

According to the hologram pattern which is designed by the computer, a mask is fabricated. There are several possible methods for mask fabrication, such as by using electron beams [See, for example, R. W. Hawly et al., Appl. Opt. Vol. 29, No. 2 (1990), 216–224], or by using optical means with or without optical demagnification and others. Using such methods, efficient multilevel phase holograms can be recorded with up to 100% efficiency.

According to the wavelength, temporal and spatial coherence of the beam (before the hologram transformation) the appropriate method for fabrication of the relief pattern should be chosen to meet the requirements for the energy profile resolution, place, image fidelity, etc. on the target. Lasers with unstable resonators may be used in schemes which require higher spatial coherence and in addition, line narrowing of the laser beam to improve the temporal coherence may be achieved by use of external diffraction gratings and/or intracavity line narrowing by dispersive optical components or other approaches. Laser systems using an Injection-Locked Oscillator Amplifier may be used in schemes which require highly spatially and temporally coherent light.

Figure 2:
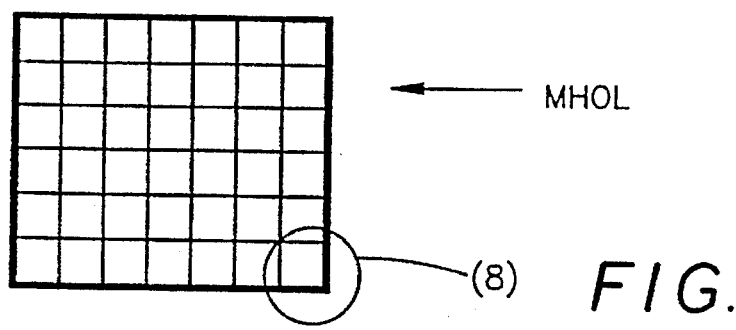
Figure 3:
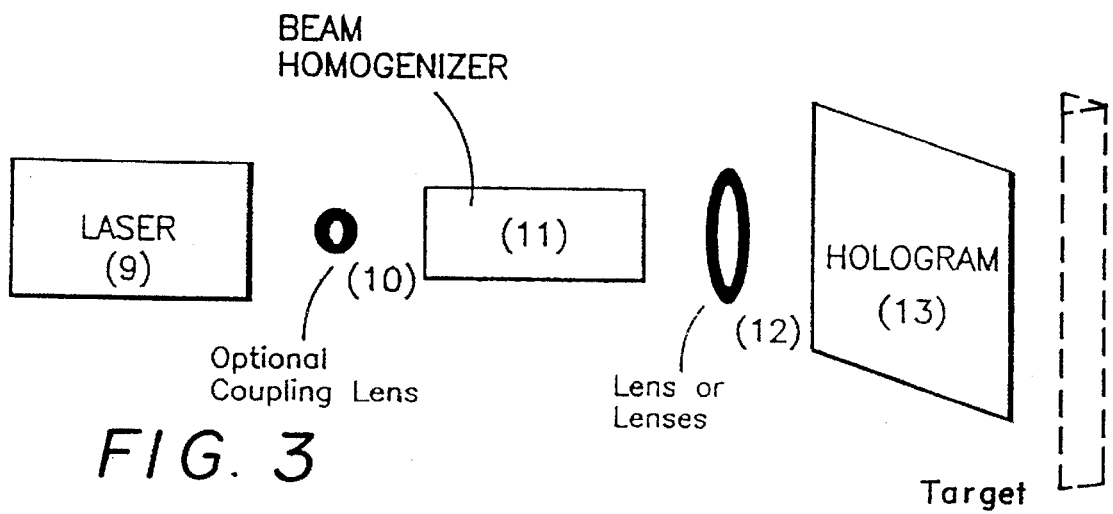

For specific lasers and material processing application we suggest a new type of CGH, which we call Multi Holographic Optical Element (MHOL). Some high power lasers, such as Excimer and $CO_2$, have beam profiles which are not highly reproducible in the long and short term. It is difficult to follow the changes in the initial beam profile that has to be transformed from pulse to pulse during the material processing, during the aging of the laser medium, aging of electrodes, etc. This, of course, can prevent practical use of a conventional CGH which is designed for a given input beam profile, since unpredictable changes in this profile will end up in unpredictable changes in the output energy profile. Therefore, we design and fabricate a hologram which is constructed from small elements in which each of them contains all the information for the final transformed energy profile structure (see 8 in FIG. 2). In this case each ray entering into the hologram is split into subrays that reach different places on the target.

On the target, one gets several profiles with the same overlapping structure. If the dimensions of the hot/cold spots or any other random intensity variations are big compared to the basic holographic element (8 in FIG. 2) the effect of those intensity changes will cause a variation of the intensity of individual profiles. But the final profile which contains several overlapped profiles may remain undisturbed. A similar approach is the use of diffusers in digital holography in analogy to diffuse recording in optically recorded holograms [See, for example, R. Brauer, J. Opt. Soc. Am. A, Vol. 8, No. 3, (1991), 572–578].

There are some typical problems using this kind of element as compared to the conventional method of designing CGH. The Fresnel rings which are due to diffraction from the basic elements can be treated in the design process by iterative calculations of the hologram (usually it may require a few steps). Because several rays meet at each point on the target using these type of elements, interference fringes may appear on the target. Limited spatial and/or temporal coherence of the processing laser source will smooth the fringe pattern because of the diffraction angle broadening for a given ray. Therefore, for applications which do not require high resolution modulation of the energy profile on the target, using MHOL or similar approaches may be the ideal, and may allow the use of lasers with lower quality beam profiles.

6.1.3. Combined Physical and Geometrical Optical Technologies for Beam Transformation As was mentioned previously, high power lasers may have beam profiles with low reproducibility in the long and/or short term, low beam pointing stability, etc. Therefore, we combine the use of beam homogenizers which improve the beam profile quality, reproducibility, stability, etc., with redistributing energy elements such as holograms. In particular, we suggest using a beam homogenizer of the channel integrator type with CGH holograms (FIGS. 3 9–13). Using channel integrator beam homogenizers (11 in FIG. 3) it is possible to get uniform and stable energy beam profiles on a specific plane, but with divergence which is bigger than the initial beam laser divergence. This increase in the divergence will decrease the performance of a given hologram in a given image plane distance in terms of the energy profile resolution and accuracy on the target. This can be improved by decreasing the distance of the hologram (13 in FIG. 3) from the target. This requires decreasing the typical pixel sizes in at least the same factor as an increase in the diffraction angle. Nowadays, commercial beam homogenizers for excimer lasers have less than 15 mrad divergence for the exit uniform energy plane, and use of electron beams for the hologram fabrication will provide relief patterns with submicron pixel sizes. Therefore, it is possible to get energy beam profiles on a target with less than 5% aberration by combining such a beam homogenizer with an electron beam CGH (using a regular commercial excimer laser with a stable resonator). Of course, this combination will be easier for lasers with longer wavelengths because of the diffraction angle increase which permits decreasing the minimum hologram to target distance. This also decreases the aberrations which are due to the large divergence of the entering ray.

6.2 Methods Which Are Based on Controlling of the Number of Pulses (or Exposure Times) as a Function of Place to Generate a Defined Structure The object in this approach for beam transformation is to provide methods of controlling the material processing by light as a function of place by using different numbers of pulses (or exposure times in CW lasers) with the same energy as a function of place.

When it is possible to control the material processing by controlling the number of pulses or exposure times (for example when the desirable etch depth is larger than the etching depth per pulse), then it is possible to derive a program for the processing in which different parts of the material are exposed to different numbers of pulses to get the desirable spatial structure. The first step is to compute the number of pulses (or exposure times) that the material should be exposed to as a function of x,y,z which are arbitrary spatial coordinates. Or in other words, for $P(x,y,z) \leftrightarrows E(x,y,z)*E_0$ where P is the amount of the specific processing in a quantitative form (for example depth of etching) and $E_0$ is the energy density of the pulse or the basic controlled unit in a CW laser, N is the number of pulses or exposure time. Therefore when the relation between P and E is known, N can be easily derived [See, for example, A. Fuxbruner et al., Appl. Opt., Vol. 29, No. 36, (1990), 5380–5385]. We suggest two basic approaches to implement N(x,y,z) on the target surface.

6.2.1. System with Computer-Time Controlled Apertures or/and Stops

Figure 4:
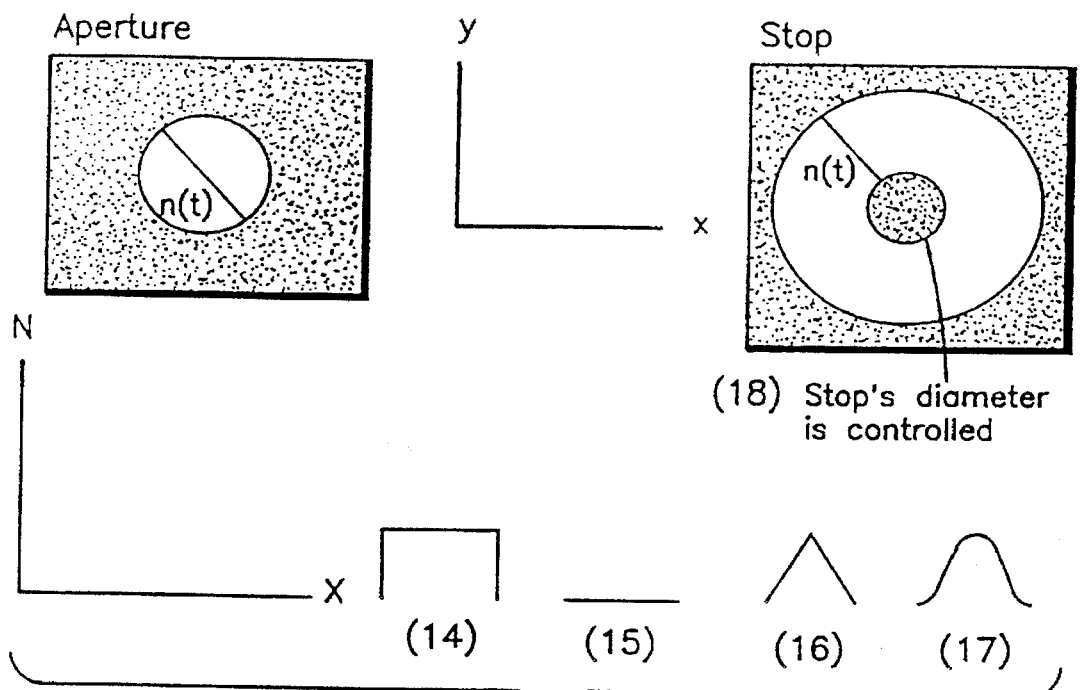

The basic idea is to image an aperture or a stop on the target surface and to change the dimensions of this imaged aperture or stop during the processing by a computer to get the desirable N(x,y,z). In this case the structures of those apertures and stops are not limited, but as an example, for a circular aperture (FIG. 4) it is possible to get any N(x,y,z) profile with circular symmetry in which the center gets more or equal numbers of pulses than the vicinity, by controlling the opening (or closing) velocity in each time point of the processing (or in step operation in which the length of time is controlled at each position). If the aperture remains open, the N profile will be like 14 in FIG. 4, 15 for a closed aperture, 16 for an aperture which is closed or opened in a constant velocity, and for a variable velocity it is possible to get arbitrary profiles like 17 (which is a Gaussian profile). Stops that are closing towards the edges (as 18 in FIG. 4) will implement N profiles that have higher values on the edges.

Figure 5:
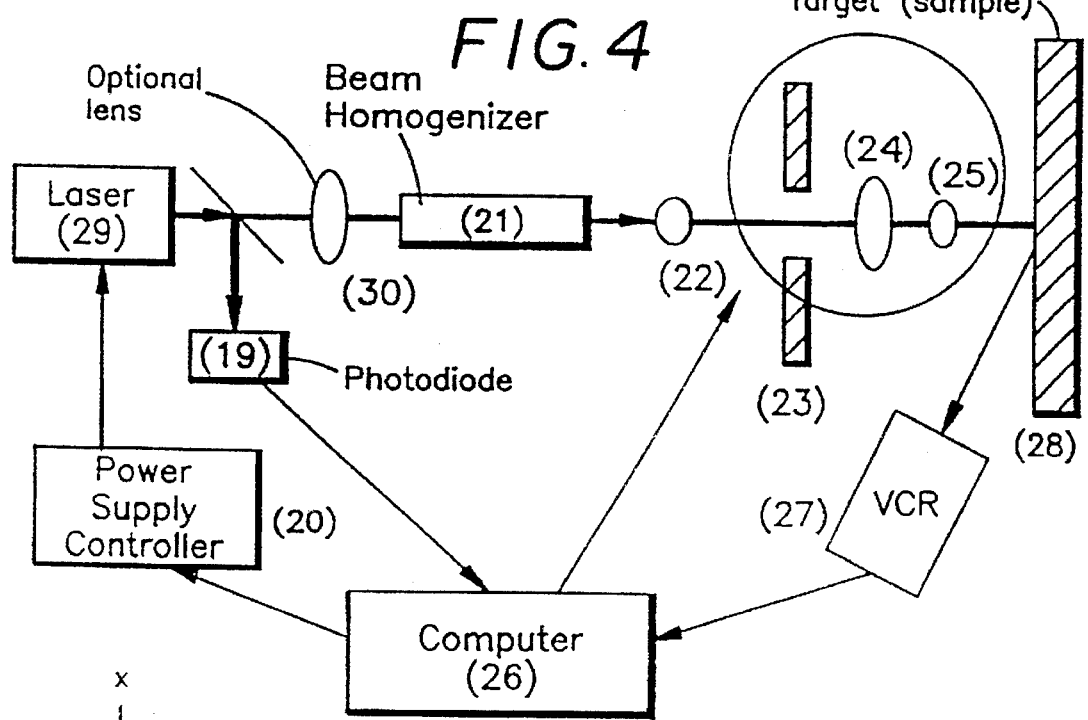

It may be worthwhile to combine this approach with the use of a beam homogenizer, to achieve higher optical quality of the initial beam and to reduce diffraction patterns on the target than can be achieved by the use of apertures or stops with coherent light. As was mentioned, the beam homogenizer decreases the spatial coherence and therefore may smooth the image of the aperture-stop on the target (28 in FIG. 5). A simple scheme is described, for example, in FIG. 5 in which the output of the laser (29) is monitored by a photodiode (19) and this is used to control the laser energy and its stability in short and long term operation (power supply control unit, 20 in FIG. 5). In some high-power lasers the energy per pulse (or power) changes during the laser medium aging and this can be compensated by changing the current-voltage control of the laser. But this may cause changes in the beam profile structure and its finger print; therefore it is a problematic point in material processing unless homogenization is done as in this scheme. The computer controlled aperture (or stop) is placed in the plane of uniform energy (23) after the beam homogenizer and the field lens (21 and 22 in FIG. 5). It is controlled by a computer (26) which may control the momentary velocity of the opening/closing or the total time that the aperture/stop remains in each position-dimensions (if a step motor controls the opening or closing). The aperture (or stop) is imaged by one or more imaging lenses (24) which are placed on a motorized stage to change its position in the x direction to achieve a desirable image plane distance and demagnification/magnification of the aperture. The imaging elements may include, for example, a cylindrical lens (25) which is mounted on a rotation stage controlled by the computer to achieve images of the aperture with cylindrical distortions in any angle in cases where it is needed to get a desirable structure on the target. As in the case of 24, 25 may also be placed on a translation stage (z direction) to control the cylindrical correction. The system may include a VCR camera (27 in FIG. 5) that follows the process and is connected to the computer or any other element and/or device.

6.2.2. System with Opaque Negative Masks

Figure 6:
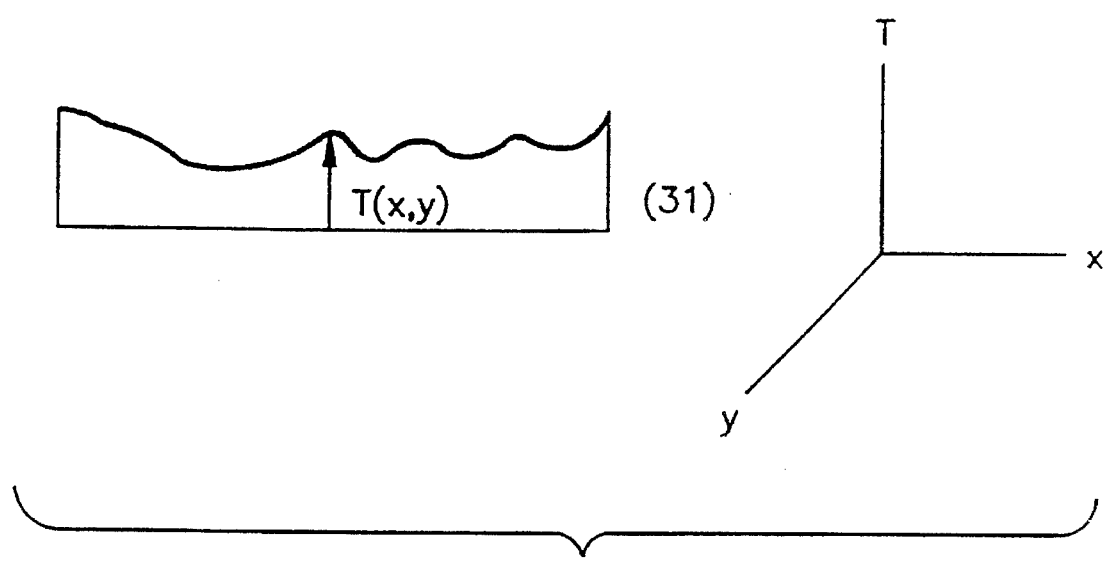

This embodiment of the method uses masks with an inhomogeneous thickness which is the negative of N(x,y). This should be fabricated from a material which is not transparent to the processing light and is etched by the processing light in a known manner. The material can be organic or inorganic and the mask may be placed on the target or elsewhere. If the depth of etching for a given pulse energy density is known, the minimum thickness of the mask in a local point x,y can be derived easily. By subtracting the number of desired pulses in this point, N(x,y), from the maximal N on any place on the target and by multiplying it by the depth of etching per pulse gives the minimal thickness $T(x,y) > D*[N_{max} - N(x,y)]$, where D is the etching depth per pulse, T is the local thickness (31 in FIG. 6). In a similar way for CW lasers one has to consider the basic units of power density rather than pulse energy density in the above equation. Thus this approach can be considered one that uses a "negative" type mask. These masks are based on simple absorption and can be combined easily with beam homogenizers because there is no need for coherence. Therefore, the mask may be placed in a plane of uniform energy, or on the target (5 or 7 in FIG. 1).

We claim:

1. A method of producing a stable, reliable, spacial energy profile simultaneously across a selected area of a material to be processed, comprising:

determining the responsiveness of a material, to be processed by a laser, to the wavelength, energy and pulse width of a laser source;

generating a high power laser beam from said laser source, the beam having low spatial and temporal coherence;

directing said laser beam through a beam homogenizer to produce a homogenized plane of energy at a controlled distance from said homogenizer;

transforming said homogenized plane of energy in space by directing said homogenized beam through multielement holographic filters to reshape the beam to have an energy profile for producing a selected structure in a material to be processed; and directing said transformed energy profile to said material to be processed.

2. The method of claim 1, wherein the step of transforming said homogenized plane of energy includes directing said beam through computer generated holograms selected to match the known dependence of said material on a laser with said laser source.

3. The method of claim 2, wherein the step of transforming said homogenized plane of energy includes directing said energy through a first holographic filter element to reshape said beam into a selected near field intensity profile and further directing said beam through a second holographic filter element to selectively phase shift the beam, thereby conforming said energy profile to a curved surface on said material to be processed.

4. The method of claim 2, wherein the step of transforming said homogenized plane of energy includes providing a multielement hologram wherein each element contains a complete energy profile for said selected structure and directing said energy through all of the elements of said multielement hologram to produce overlapping energy profiles on said material to be processed.

5. The method of claim 2, wherein the step of transforming said homogenized plane of energy includes fabricating an optical mask comprising said holographic filters and positioning said mask in the path of said homogenized plane of energy to reshape said beam to control the exposure of said material to said beam.

6. A method of producing a stable, reliable, spacial energy profile simultaneously across a material to be processed, comprising:

determining the responsiveness of a material to be processed to the wavelength, energy, and pulse width of a laser beam;

directing said laser beam through a beam homogenizer to produce a homogenized plane of energy at a controlled distance from said homogenizer;

producing a computer generated multielement holographic filter to match the determined responsiveness of said material to a laser beam, each element of the filter transferring the energy profile of a laser beam;

directing said homogenized beam through said holographic filter to transform said beam to produce multiple overlapping energy profiles on said material which each match the determined responsiveness of said material to thereby reshape the beam to produce a selected energy profile; and directing said transformed beam to said material to produce on said material a stable spacial energy profile.

7. The method of claim 6, further including directing said beam through a second holographic filter to selectively phase shift the beam to conform the energy profile to a curved surface on said material.

* * * * *